Patented Mar. 17, 1936

2,034,457

UNITED STATES PATENT OFFICE 2,034,457

SYNTHETIC RESINS AND COMPOSITIONS

Howard L. Bender, Bloomfield, N. J., assignor to Bakelite Corporation, New York, N. Y., a corporation of Delaware No Drawing. Application October 19, 1932, Serial No. 638,534

14 Claims. (Cl. 260—4)

This invention relates to synthetic resins and products including them. It comprises more particularly resinoids, that is synthetic resins which are heat-hardenable in their initial and intermediate reaction stages, of the phenol-aldehyde type that are characterized by a hydrophile nature but convertible to a hydrophobe type by the application of heat alone and which because of these properties find useful applications of decided technical importance.

Resinoids are extensively used as bonding media for fibrous and granular materials in the manufacture of products molded under heat and pressure; these products include laminated articles wherein fibrous sheets (paper, fabric etc.) are so bonded. Particularly, resinoids of the phenolic type have been adopted as bonding media for molded articles on account of the superior electrical properties and resistance to moisture and other atmospheric conditions imparted by the heat-hardened insoluble and infusible resinoids to the articles so made.

The common known practice followed in molding laminated articles consists in preliminarily coating sheets of paper, canvas or similar materials with an alcohol or benzol-alcohol solution of a phenolic resinoid in its reactive, i. e. heat-hardenable, form. Thereafter the impregnated sheet, usually in the form of a continuous web, is passed through a drying device whereby the solvent is removed and the resinoid left in a substantially dried condition; normally about 5% volatiles remain in the sheet. There are a number of objections to this procedure; most of the resinoid deposited from such solutions is concentrated as a coating on the sheet; the solvent forms an expensive item and adds materially to the cost; moreover care must be exercised when applying heat to drive off the solvent so that the resinoid is not hardened or advanced to such an extent as to impair a proper bonding action. Furthermore, a relatively high resinoid content is required in order to secure adequate covering of the fibers in the making of laminated goods; a resinoid content below 35% is apt to result in inferior or non-mercantable laminated products and usually a resinoid content of at least 50% is found to be necessary to obtain the desired properties. Even with a high resinoid content, finished laminated structures show great differences in electrical and other properties depending upon direction of the test; for instance electrical resistance and resistance to water penetration parallel to the laminations are much less than transverse to the laminations.

The objections above noted which follow from the use of reactive phenolic resinoid in organic solvents have been increasingly appreciated in the laminated industry. There has accordingly been a persistent effort toward the development of other methods of incorporating resinoid binders. For instance, a substitute method is the so-called wet process method, wherein the resinoid binder as a powder or a sludge is added to a wet pulp in a paper beater and the wet pulp is thereupon formed into a sheet on a Fourdrinier machine or a cylinder machiner. But this method requires paper mill equipment in which the drier must be of a character that does not cause fusion or advancement or polymerization of the resinoid, and experience has shown that there are limitations upon the types and conditions of phenolic resinoids that can be used. A variation of the foregoing method consists in using an alkaline aqueous solution of a resinoid instead of the customary alcoholic solution, mixing the solution with a wet fibrous pulp, and thereupon precipitating the resinoid from the solution by the use of a neutralizing or acidifying agent and filtering off the water; neutralization or acidification, however, involves the formation of salts which remain in the composition and have the tendency to interfere with the electrical properties and to increase water absorption as well as other objectionable effects. In all of these prior art methods,—the alcohol-solution, the wet process and the aqueous alkaline solution—the resinoid is found to be in the form of discrete particles or aggregates, for definite masses or lumps of resinoid can be identified among the fibers in the final molded articles. There is no reduction in the amount of resinoid required by the wet process or alkaline solution methods from that of the alcohol-solution method for bonding purposes.

According to the present invention phenolic resinoids can be obtained which in the form of suspensions or dispersions in water do not concentrate upon application on the surface of a sheet in the manner of alcoholic solutions, and on the other hand they do not require neutralizing or acidifying agents to deposit them and subsequent filtering. It is a distinguishing characteristic of the resinoids of this invention that they are hydrophile in nature; for instance, they disperse in water with great readiness. Yet they do not appear to form true water solutions, since there is a limit to the extent to which water containing them can be diluted without causing precipitation; and they can be made to lose their hydrophile characteristic as by the application of heat and become hydrophobic or repellent to water.

In order to exhibit the hydrophile property, it is not essential that the water in which such a resinoid is suspended or dispersed be free from organic solvents. Solvents such as alcohol can be included, particularly if the water content is such that, after addition to a fibrous mass and upon evaporation of solvent, enough water remains to ensure dissemination of the resinoid throughout the fibrous mass. For instance it is found that a hydrophile resinoid in a mixture of alcohol and water having as little as 10% water will exhibit the properties here set forth.

A most marked and unexpected effect following from the application of these resinoids suspended in water to fibrous materials is the uniformity and the extent of the resinoid distribution effected merely by applying the aqueous mass and then evaporating the water content; no precipitants are required nor is there any need for filtration or other mechanical separation. The uniformity of distribution is evidenced by bonded articles made therefrom. For instance, it is found that the resinoid content can be reduced to 30% or less to yield a laminated article with adequate covering of the fibers and a distribution of resinoid beneath the surface such that the article can be sanded or otherwise machined without creating a striated appearance; this is not feasible with laminated articles prepared from varnish coated sheets on account of the concentration of the resinoid in layers. From the standpoint of improvement in properties, the hydrophile resinoid used as here described even in reduced proportions, gives a wholly unexpected increased water resistance to the final article out of proportion to that obtained under the hitherto known methods using the same amount of resinoid; thus a 25% impregnated board that was made in accordance with this invention showed a water resistance superior to one containing 50% resinoid applied by ordinary alcohol solution.

I have found that these hydrophile resinoids can be prepared in various ways. For example, 94 grams of phenol and 80 grams of aqueous formaldehyde (40% solution) can be heated in the presence of about 1 gram of sodium hydroxide based on the weight of phenol for about 20 minutes; at the end of this heating period the liquid mass is still clear and no precipitation has occurred, though the resinoid content formed constitutes about 60% of the total mass. If the liquid mass is diluted with about an equal amount of water or until the resinoid content is reduced to about 30%, it still remains clear without any signs of precipitate; however, if the amount of water be then materially increased, the mass becomes cloudy, thus indicating a colloidal precipitation. Even in this condition, however, the liquid mass readily disseminates and does not leave gummy deposits characteristic of resinous precipitates from solutions.

A reaction product of the phenolic type can be made dilutable with water under operating conditions, differing from the above, such as a longer heating period with an increased caustic content. For instance the addition of from 5 to 10% or more of caustic based on the phenol results in a liquid mass that can be diluted with water as desired. In general the longer the reaction time, the greater is the proportion of caustic needed to give solutions. However, as the amount of caustic used is increased beyond 1 or 2% the mass appears to take on more and more the characteristics of a resinoid soap in solution and at 4% or more to exhibit the properties of true salt solutions to the extent of requiring precipitation or neutralization by known means such as alum to remove caustic present in excess of 4% and preferably caustic in excess of 2% before molding.

I have furthermore found that the aqueous mass need not be of an alkaline character. For example, if proportions of phenol and formaldehyde solution as above are reacted in the presence of less than 4% of sodium carbonate, the mass can be acidified for example by sufficient sulphuric acid to just neutralize the sodium carbonate. The neutralized solution can be used. Or a small amount of an hydroxy aromatic acid, such as phenol, tannic acid, etc. can be added to give an acid reaction, and stable aqueous masses are thereby obtained which can be diluted with water; apparently such acids do not destroy the colloidal condition or the hydrophile property of the resinoid. Acidification functions to retard the progressive changes that take place in a resinoid under alkaline conditions upon standing.

The phenols suitable for the manufacture of hydrophile resinoids in accordance with this invention include in addition to phenol and cresol the higher alkyl and aryl substituted phenols as well as other hydroxy substituted ring compounds together with polyhydroxy closed chain compounds. In general, however, the higher phenols may necessitate the inclusion of a percentage of water-miscible solvent, such as alcohol, acetone, etc. to secure or maintain the desired dispersion in a water medium.

The agents for reacting with the phenols to form hydrophile resinoids include aldehydes as formaldehyde, benzaldehyde, acrolein, furfural, their polymers and mixtures, substituted aldehydes as hexamethylenetetramine, and ketones such as acetone or others of similar condensing or resinifying functions with phenolic bodies; these are herein grouped under the general term of aldehydic agents. Alkaline catalysts are used to promote the reaction, but they can be neutralized or the resinoid mass acidified as pointed out above. Primarily, it is desirable that the resinoid reaction be arrested prior to any substantial precipitation or separation of resinoid in the liquid mass, and that the resinoid-containing reaction mass in this condition of initial reaction be applied to the fibrous material; or where precipitation tends to occur in the early reaction stages, that a percentage of water miscible solvents, say 10% more or less in the case of alcohol, be added to avoid resinoid separation. The extent to which the reaction may be carried can be tested by noting that a sample is still dilutable or dispersable with water.

Applying the hydrophile resinoid dispersed in water as compared with a varnish or alcoholic solution, to a fibrous material, such as a paper sheet, is accompanied by marked changes in the resinoid distribution. Nearly anhydrous alcoholic and similar solutions of resinoids tend to cause concentration at the surfaces, and the solvents are more or less retained to create bubbles during a subsequent hot-pressing operation; to the contrary, the hydrophile resinoid in water readily penetrates and permeates the fibrous structure, particularly if the fiber is wet (say 50% moisture content), to yield a highly uniform dissemination of the resinoid, and the water is readily released upon drying as the resinoid takes on the hydrophobic properties. The liquid mass can, however, be applied externally or internally to dry or wet fibrous sheet or board stock, wood, etc. and dried. Upon removal of the volatile content by evaporation the resinoid does not appear to separate as irregular or discrete particles or gummy aggregates, found to be the case with resinous precipitates from solutions, but to deposit in the form of films upon individual parts of or within the fibres themselves, thereby accounting for the marked increase in waterproofing effect on the fibers as compared with the same resinoid percentage applied in alcoholic or other solution.

That there is a marked difference in resin distribution by the use of hydrophile resinoids from that obtained with resinoids in solution can be demonstrated by attempts to remove the resinoids from the fibers after impregnation. Resinoids deposited from organic solvent can readily be removed with completeness from the dried impregnated fibers by solvent extraction, washing with soap solutions, etc. Resinoids deposited in hydrophile form in a fibrous material are in part only removable by solvents or boiling soap solutions; the remainder appears to be locked within crevices of the fibers where organic solvents fail to penetrate.

Drying the impregnated fibrous sheet by removing the water content by a current of air or other suitable means, leaves the resinoid in a heat-hardenable condition. When sufficient amounts of resinoid are included, the sheets, either as individual or superposed sheets or as matted layers as in cardboard, can be submitted to the action of heat and pressure for a period, as is customary in the laminated practice (for example, at about 135 to 150° C. under pressures from 1000 to 2000 pounds per square inch for 10 minutes more or less depending upon the number of sheets), to yield bonded laminated products having superior surface appearance as well as uniformity of resin distribution throughout the structure. For instance, a product molded from a fibrous material having a resinoid content of about 25% of a resinoid in a hydrophile condition showed molding characteristics and a surface appearance comparable to those of a product made with a 50% resinoid content by the alcoholic solution method. In another instance to show the improvement in water resistance, a wood fiber composition was made with about 35% of resinoid by the beater pulp process, and this when sheeted and molded into a laminated product showed a water absorption of about 6%; but when the same fibrous material was impregnated in sheet form with a hydrophile resinoid to about the same resinoid content and molded, the water absorption of the molded product was found to be about 1%.

It is not essential that the hydrophile resinoid be applied to fibrous sheet material as paper, fabric or the like. It can be incorporated with loose fibers and preferably fibers such as wood or cellulose fibers that have some moisture content, and the resulting mass after dehydration can be molded in the customary manner with heat and pressure or pressed into a desired shape and then baked. In order to make moldable compositions from loose fibers, however, it is more practical to add about 30% of the total resinoid content as a hydrophile resinoid, and after the treated fibers are dried, the balance of the resinoid required for bonding is admixed in the form of a powdered solid heat-reactive resinoid.

Similarly, in the manufacture of laminated products, fibrous sheets can be first treated with a small percentage of a hydrophile resinoid, and thereafter a resinoid binder in the form of a varnish can be applied. By this means electrical properties and resistance to water absorption in a hot-pressed laminated product are retained with a considerable reduction in the total resinoid content demanded in order to obtain those properties with a varnish alone. These improved results are also exhibited by wood, fibrous board, etc. first treated with a hydrophile resinoid, and then coated with a resinoid varnish or with other protective coatings such as asphalt or melted sulphur.

As a comparative illustration, a sample of kraft paper in one case was impregnated with a standard varnish consisting of an alcohol solution of a cresol formaldehyde resinoid to give a 40% resinoid content. The treated paper was dried and made into a tube on a mandrel in a tube rolling machine and then cured or heat-treated. The tube showed a 10% water absorption in 4 days. In a second case, a sample of the same kraft paper was treated with a hydrophile resinoid made from cresol and formaldehyde to 10% by weight of the paper and the water removed. The dried paper was then coated with the same resinoid varnish as in the first case so that the total content of varnish resinoid and hydrophile resinoid amounted to 40%. The paper was rolled into a tube, and the tube when tested showed a water absorption of only 5% in 4 days. In other words the water absorption was decreased one-half by substituting a hydrophile resinoid for one-fourth of the varnish resinoid. This improvement with regard to tubes is of special significance, since the method of manufacturing tubes does not permit the use of high pressures such as can be applied to flat plates as a corrective measure.

I claim:

1. Resinous condensation product of a phenol with a member of the group consisting of aldehydes and their polymers, compounds engendering aldehydes, and ketones, said product being in hydrophile form capable of holding up to about 70 parts of water per 30 parts of resinous product but not substantially in excess thereof and being directly convertible to a hydrophobe form by the action of heat.

2. Resinous condensation product of a phenol with a member of the group consisting of aldehydes and their polymers, compounds engendering aldehydes, and ketones, in the presence of a base limited in proportion to less than 4 percent by weight of the phenol, said product being in hydrophile form capable of holding up to about 70 parts of water per 30 parts of resinous product but not substantially in excess thereof and being directly convertible to a hydrophobe form by the action of heat.

3. Resinous condensation product of a phenol with a member of the group consisting of aldehydes and their polymers, compounds engendering aldehydes, and ketones, in the presence of a base limited in proportion to less than 2 percent by weight of the phenol, said product being in hydrophile form capable of holding up to about 70 parts of water per 30 parts of resinous product but not substantially in excess thereof and being directly convertible to a hydrophobe form by the action of heat.

4. Resinous condensation product of a phenol with a member of the group consisting of aldehydes and their polymers, compounds engendering aldehydes, and ketones, in the presence of a base limited in proportion to less than 4 percent by weight of the phenol, acidified with a weak hydroxy-aromatic acid, said product being in hydrophile form capable of holding up to about 70 parts of water per 30 parts of resinous product but not substantially in excess thereof and being directly convertible to a hydrophobe form by the action of heat.

5. Composition comprising a fibrous material having incorporated therewith a resinous condensation product of a phenol with a member of the group consisting of aldehydes and their polymers, compounds engendering aldehydes, and ketones, said product when incorporated being in hydrophile form capable of holding up to about 70 parts of water per 30 parts of resinous product but not substantially in excess thereof and being directly convertible to a hydrophobe form by the action of heat.

6. Composition comprising a fibrous material having incorporated therewith a resinous condensation product of a phenol with a member of the group consisting of aldehydes and their polymers, compounds engendering aldehydes, and ketones, said product when incorporated being in hydrophile form capable of holding up to about 70 parts of water per 30 parts of resinous product but not substantially in excess thereof and being directly convertible to a hydrophobe form by the action of heat and a separately incorporated binding agent including a heat-hardenable synthetic resin.

7. Composition comprising a fibrous material having incorporated therewith a heat-hardened resinous condensation product of a phenol with a member of the group consisting of aldehydes and their polymers, compounds engendering aldehydes, and ketones, said product when incorporated being in hydrophile form capable of holding up to about 70 parts of water per 30 parts of resinous product but not substantially in excess thereof and being directly convertible to a hydrophobe form by the action of heat.

8. Process of preparing a resinous product in hydrophile form which comprises reacting a phenol with a member of the group consisting of aldehydes and their polymers, compounds engendering aldehydes, and ketones, and arresting the reaction when the reaction product is capable of holding up to about 70 parts of water per 30 parts of resin but not substantially in excess thereof.

9. Process of preparing a resinous product in hydrophile form which comprises reacting a phenol with a member of the group consisting of aldehydes and their polymers, compounds engendering aldehydes, and ketones, in the presence of a base limited in proportion to less than 4 percent by weight of the phenol, and arresting the reaction when the reaction product is capable of holding up to about 70 parts of water per 30 parts of resin but not substantially in excess thereof.

10. Process of preparing a resinous product in hydrophile form which comprises reacting a phenol with a member of the group consisting of aldehydes and their polymers, compounds engendering aldehydes, and ketones, in the presence of a base in proportion of not more than 2 percent by weight of the phenol, and arresting the reaction when the reaction product is capable of holding up to about 70 parts of water per 30 parts of resin but not substantially in excess thereof.

11. Process of preparing a fiber-resinoid composition which comprises impregnating a fibrous material with an aqueous composition containing a hydrophile resinous condensation product of a phenol with a member of the group consisting of aldehydes and their polymers, compounds engendering aldehydes, and ketones, said product being capable of holding up to about 70 parts of water per 30 parts of resinous product but not substantially in excesses thereof and being directly convertible to a hydrophobe form by the action of heat, and thereafter converting the resinous product to the hydrophobe form.

12. Process of preparing a fiber-resinoid composition which comprises impregnating a fibrous material with an aqueous composition containing a hydrophile resinous condensation product of a phenol with a member of the group consisting of aldehydes and their polymers, compounds engendering aldehydes, and ketones, said product being capable of holding up to about 70 parts of water per 30 parts of resinous product but not substantially in excess thereof and being directly convertible to a hydrophobe form by the action of heat, and thereafter dehydrating and converting the resinous product to the hydrophobe form.

13. Process of preparing a fiber-resinoid composition which comprises impregnating a fibrous material with an aqueous composition containing a hydrophile resinous condensation product of a phenol with a member of the group consisting of aldehydes and their polymers, compounds engendering aldehydes, and ketones, said product being capable of holding up to about 70 parts of water per 30 parts of resinous product but not substantially in excess thereof and being directly convertible to a hydrophobe form by the action of heat, and thereafter dehydrating, adding a different resinous binder and converting the resinous product to the hydrophobe form.

14. Process of preparing a fiber-resinoid composition which comprises impregnating a fibrous material with an aqueous composition containing a hydrophile resinous condensation product of a phenol with a member of the group consisting of aldehydes and their polymers, compounds engendering aldehydes, and ketones, said product being capable of holding up to about 70 parts of water per 30 parts of resinous product but not substantially in excess thereof and being directly convertible to a hydrophobe form by the action of heat, and thereafter dehydrating, coating the impregnated material with a different resinous binder and converting the resinous product to the hydrophobe form.

HOWARD L. BENDER.